Oct. 29, 1957 P. CHRISTOPH 2,811,047
FRICTIONLESS COUPLING
Filed Jan. 5, 1955
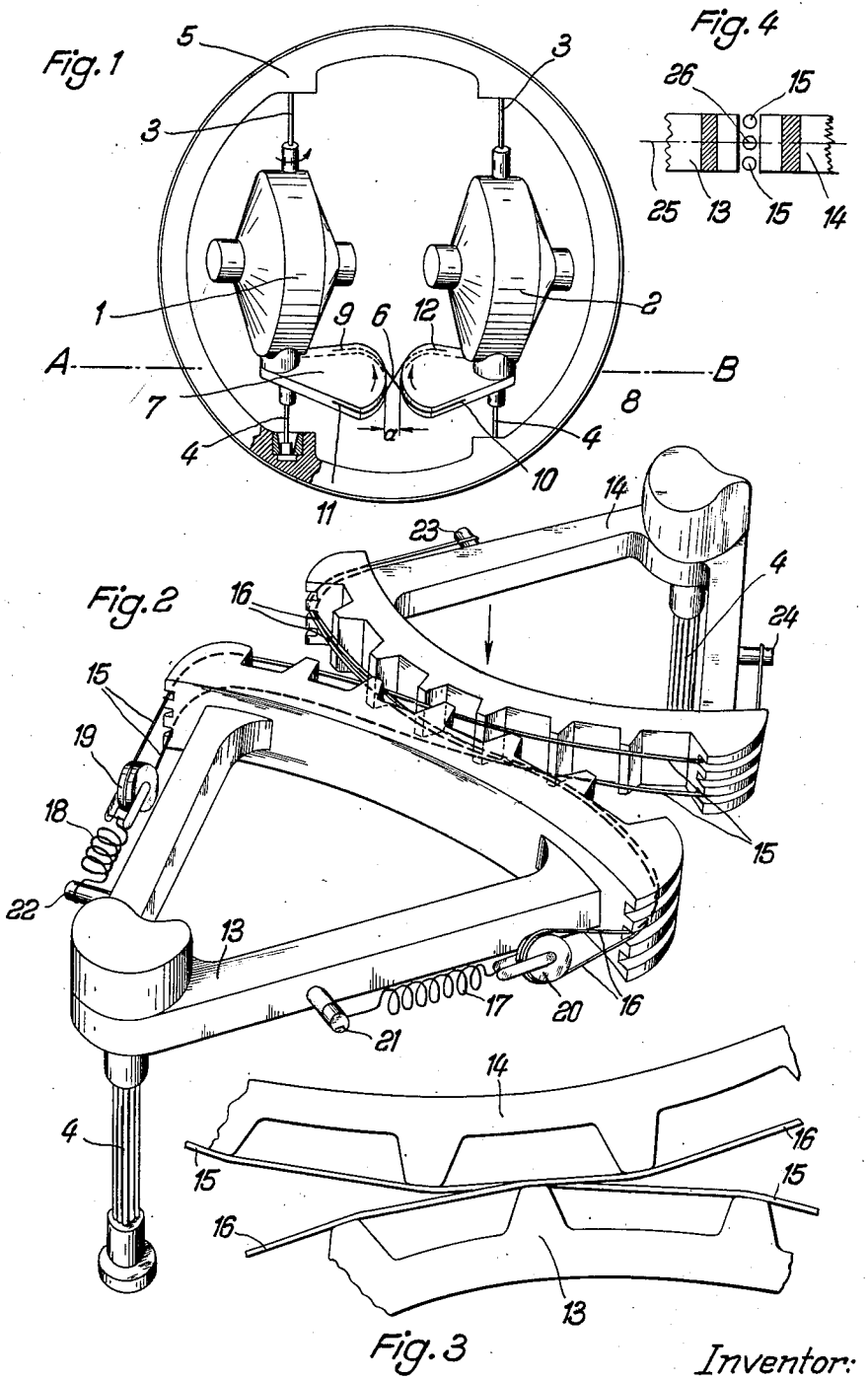
Inventor:
PETER CHRISTOPH
BY:
Michael S. Striker
Agt.

United States Patent Office 2,811,047
Patented Oct. 29, 1957

2,811,047

FRICTIONLESS COUPLING

Peter Christoph, Hamburg-Schmalenbeck, Germany

Application January 5, 1955, Serial No. 480,041

7 Claims. (Cl. 74—96)

The present invention relates to frictionless couplings. This application is a continuation-in-part of copending application Serial No. 296,659, filed July 1, 1952 and matured to Patent No. 2,734,280 entitled Gyro-Compasses.

In many precision instruments it is necessary to support certain elements for movement in given directions with respect to each other and where linkages or the like interconnect such elements to produce the desired element movements therebetween, the friction resulting from the movement of the linkage components has often a detrimental effect on the apparatus. In fact the accuracy of the relative movement between such elements is dependent on the accuracy of the construction of such a linkage, so that when the linkage components become worn or if they are not manufactured with the greatest precision the accuracy of the entire device diminishes undesirably.

One of the objects of the present invention is to overcome the above drawbacks by interconnecting a pair of members for equal and opposite movement with respect to each other in a completely frictionless manner.

Another object of the present invention is to constrain a pair of elongated members to rotate equally in opposite directions while at the same time eliminating any tendency of these elongated members to move toward or away from each other where the members are located opposite each other and are parallel to each other.

A further object of the present invention is to interconnect a pair of elements for equal and opposite movement in such a way that the elements cannot turn about an axis extending between parallel axes of rotation of these elements, respectively.

Furthermore, it is an object of the present invention to provide an arrangement where any shocks cannot be transmitted from one element to another element even though these elements are interconnected for equal and opposite movement with respect to each other.

It is additionally an object of the present invention to provide a structure capable of accomplishing all of the above objects and at the same time being made of simple and ruggedly constructed parts which will operate reliably over a long period of time with a minimum of maintenance.

With the above objects in view the present invention mainly consists of a frictionless coupling which includes a pair of elongated parallel carriers for respectively carrying a pair of devices. A support means mounts the carriers for respective turning movement about their axes. A pair of motion transmitting members are respectively fixed to the carriers and extend from the same toward each other. A band means extends from one of the motion transmitting members along a path between such members to the other of the motion transmitting members and is connected to both of the motion transmitting members for turning one of these members and the carrier connected thereto equally and oppositely to the turning of the other of the motion transmitting members and the carrier connected thereto. A guide means is carried by the motion transmitting members for guiding the band means at a portion thereof located between the motion transmitting members along a straight line normal to a second straight line extending across the axes of the carriers so that during turning of the latter and the motion transmitting members therewith there is no tendency for the carriers to be drawn toward each other.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a partly sectional and partly perspective elevational view of the frictionless coupling of the invention as applied to a pair of gyroscopes;

Fig. 2 is a perspective view on an enlarged scale of the frictionless coupling of Fig. 1;

Fig. 3 is a fragmentary plan view illustrating the details of bands and gear sectors of the frictionless coupling of the invention; and Fig. 4 is a fragmentary sectional elevational view of a different embodiment of the invention showing the manner in which bands and a pair of gear sectors cooperate with each other.

Referring now to the drawings, Fig. 1 shows a pair of gyroscopes 1 and 2 which are carried by wire members 3 and 4, or the like, for rotation about the axes of these wire members, the pair of wire members 3 having axes which are common with the axes of the pair of wire members 4 respectively. Each pair of wire members 3 and 4 forms a carrier for a device which in the instant application is one of the gyroscopes, and a support means 5, in the form of a rigid ring, supports each pair of members 3 and 4, that is, each carrier 3, 4 for turning movement about its axis. As is well known, particularly in marine gyroscope instruments, the gyroscopes 1 and 2 must be interconnected so that they always turn respectively about the axes of the carriers 3, 4 by equal amounts and in opposite directions, and the present invention relates to a frictionless coupling for bringing about this result.

As is shown in Fig. 1, the carriers 3, 4 are interconnected by a frictionless coupling which includes a band means or elongated flexible means 6. This band means 6 includes a pair of bands one of which is fixed at 9 to one side of the sector 7, extends across the front of this sector 7, crosses over to the sector 8, and is then fixed to the sector 8 at 10 while the other of the bands is fixed at 11 to the sector 7, extends across the space between sectors 7 and 8 to the latter sector, and is fixed to the latter at 12. Through this arrangement, which is diagrammatically illustrated in Fig. 1, if the gyro 1 and its carrier 3, 4 turn in a counter clockwise direction, as viewed in Fig. 1 and as shown by the arrows therein, the gyro 2 and its carrier 3, 4 are compelled to turn through an equal angle but in the opposite direction, as shown by the arrow superimposed on sector 8 in Fig. 1. On the other hand should the gyro 1 turn in a direction opposite to the arrow shown in Fig. 1, then the band means 6 will compel the gyro 2 to turn in a counter clockwise direction, as viewed in Fig. 1, through an equal angle.

It is apparent that with this arrangement, which is diagrammatically shown in Fig. 1, the tension in the bands of the band means 6 will produce forces during the turning of the gyros and their carriers which will tend to draw the carriers and the gyros therewith toward each other. Moreover, the arrangement of the two bands of the band means 6 one above another will tend, because of the tension in these bands, to tilt the sectors 7 and 8 and the parts connected thereto about the axis A—B. Furthermore, the gyros tend to swing toward each other for example when they pass through their critical speed of rotation or as a result of vibrations of a ship or the like on which the gyros are mounted, and for this reason it is necessary that the structure of Fig. 1 to locate the segments 7 and 8 at a certain distance from each other shown in Fig. 1 as the distance $a$. These forces are eliminated, however, when the crossing angle of the bands as well as the distance $a$ is reduced to zero. The tilting of the sectors 7 and 8 about the axis A—B can be eliminated if the bands of the band means 6 are arranged in a symmetrical manner with respect to a median plane passing centrally through the sectors 7 and 8 between their top and bottom faces, as viewed in Fig. 1, and cross the axes of the carriers 3, 4. For example, this arrangement may be obtained if two bands extend from point 11 to point 12 at equal distances from this median plane while a single band extends from point 9 to point 10 in this plane. Instead of this single band two bands may pass between two outer bands to accomplish the same results as long as the bands are symmetrical with respect to the median plane. Any number of bands may be used to produce this result. Thus, if the entire band means 6 comprise five bands, arranged one above another, then the first, third and fifth band may extend from point 11 to point 12 while the second and fourth bands may extend from point 9 to point 10, the third band being located in the median plane and the first, second, fourth and fifth bands being arranged symmetrically with respect thereto.

Fig. 2 illustrates in detail an arrangement where the frictionless coupling of the invention is provided with bands which cross each other at a zero angle and which are arranged in such a way that tilting of the sectors about the axis A—B of Fig. 1 is prevented. The sectors 13 and 14, respectively, taking the place of sectors 7 and 8 of Fig. 1, are in the form of toothed sectors which may be cut away at their central portions to reduce their weight. Each toothed sector is provided with a plurality of teeth, and the arrangement is such that the gaps between the teeth are far wider than the teeth themselves, and moreover the teeth of one gear sector are located opposite the central portions of the gaps of the other gear sector, respectively, as is shown fragmentarily in Fig. 3.

The band means of Fig. 2 includes a pair of bands 15 and 16 which cross over each other, the teeth forming a guide means for guiding the bands, at the point of tangency between the circles along which the tips of the teeth of the sectors respectively extend as shown in Fig. 3, along a straight line normal to a second straight line extending across the axes of the carriers 3, 4, so that in this way the bands 15 and 16 cross each other at a zero angle.

Furthermore, as is apparent from Fig. 2, each of the gear sectors is provided at its outer corner portions with a plurality of parallel arcuate grooves. As is shown in Fig. 2, there are three such grooves at each corner portion of each sector, and the intermediate one of each group of three grooves is located in the above-mentioned median plane while the two outer grooves of each group are located at equal distances from this plane at opposite sides thereof, respectively. The band 16 includes a pair of parallel band portions both of which are located within the intermediate groove of the right corner of sector 13 as viewed in Fig. 2, and both of which extend along the tips of the teeth of sector 13 to the above-mentioned point of tangency of the circles along which the sector teeth are located, and from this point of tangency along the tips of the teeth of sector 14 to the intermediate groove at the left corner portion of sector 14 as viewed in Fig. 2, so that the band 16 is symmetrically located in this way with respect to the median plane passing through the sectors 13 and 14.

On the other hand, the band 15 also includes a pair of parallel band portions, but the upper one of these band portions, as viewed in Fig. 2, extends by itself through the upper groove of the left corner portion of sector 13 along the tips of the teeth of sector 13 to the abovementioned point of tangency and from the latter along the tips of the teeth of sector 14 through the upper groove of the right corner portion of sector 14, as viewed in Fig. 2. The lower band portion of band 15, as viewed in Fig. 2, is parallel to the upper band portion thereof, and extends in the same way through the lower grooves of the left corner portion of sector 13 to the right corner portion of sector 14, as viewed in Fig. 2. Thus, with this arrangement the bands are symmetrically arranged with respect to the median plane of the sectors and these sectors are prevented in this way from tilting about the axis A—B of Fig. 1.

The manner in which the bands 15 and 16 cross each other at a zero angle is shown in Fig. 3 from where it is evident that during the time that the bands cross each other they are in engagement with but a single tooth and therefore move at this time respectively along parallel lines which do not make an angle with each other. These lines along which the bands move while crossing each other are perpendicular to a straight line extending across the axes of the carriers 3, 4. In this way it is impossible for the gyros 1 and 2 and the carriers thereof to approach each other during turning of the sectors.

Furthermore, the disclosed arrangement whereby the teeth of one sector will always be located opposite a central portion of the gaps of the other sector prevents the transmission of shocks between the sectors since any sudden movement of one sector toward another will be absorbed by the tendency of the teeth of the sectors to stretch the bands rather than by contact between sectors. The provision of gaps between the sector teeth which are substantially wider than the teeth themselves, as shown in Figs. 2 and 3, greatly reduces the extent to which the bands are bent when one of the sectors tends to move toward the other of the sectors.

Furthermore, the arrangement shown in Fig. 2 includes a means that automatically compensates for stretching of the bands and any inaccuracies which might arise in the mounting thereof, such as, for example, a slight difference between the lengths of the bands. Thus, the sector 13 has a pair of pins 21 and 22 respectively fixed to and extending from its opposite sides and a pair of coil springs 17 and 18 are respectively connected to and extend from pins 21 and 22. The spring 17 is connected at its end opposite from pin 21 to a frame which turnably supports a pulley 20 about which the band 16 is guided, as shown in Fig. 2, and the spring 18 is connected at its end opposite from the pin 22 to a frame which turnably carries a pulley 19 about which the band 15 is guided. The end of band 16 opposite from pulley 20 is fixed to a pin 23 which is fixed to and extends from the left side of sector 14, as viewed in Fig. 2, while the end of band 15 opposite from pulley 10 is fixed to a pin 24 which is fixed to and extends from the right side of sector 14, as viewed in Fig. 2. These bands may be endless and may be guided about the pins 23 and 24 as well as the pulleys 19 and 20. Thus, the springs 17 and 18 are capable of compensating for any differences in the length of the bands and in stretching thereof. In order that the position of the sectors with respect to each other does not change upon stretching of the bands, the springs 17 and 18 have the same spring constant. With such an arrangement a difference in the extent of stretching of the bands will have no influence on the frictionless coupling.

When large forces are to be transmitted along the pins, then of course several pairs of bands, such as 5, 7 or 9 pairs of bands may be used. Furthermore, the shape of the teeth is not critical and the invention is not limited to the particular shape shown in the drawings.

In the particular example illustrated the bands 15 and 16 may be in the form of wires. It is also possible, however, to use flat steel bands or steel bands having some other cross section. It is only necessary that the arrangement of the bands be symmetrical with respect to the median plane as described above.

Fig. 4 shows fragmentarily and in section the sectors 13 and 14 and indicates the median plane 25 passing centrally between these sectors. With the arrangement of Fig. 4 the same band 15 is used as in Fig. 2. However, instead of a double band 16, a single band 26 is provided and is located within the plane 25, as shown in Fig. 4, while the upper and lower parallel portions of band 15 are equally spaced from band 25, so that the arrangement of Fig. 4 is capable of providing the same results as the above described structure. The band 26 may be fixed at one end to the pin 23, and will extend therefrom in the same way as band 16 through the central grooves at the left corner of sector 14 and the right corner of sector 13, as viewed in Fig. 2, and the pulley 20 may be eliminated since the band 26 may simply be connected directly to the end of spring 17 opposite from pin 21.

It will be understood that each of the elements described above, or two or more together, may also find a useful application in other types of frictionless couplings differing from the types described above.

While the invention has been illustrated and described as embodied in frictionless couplings for gyro compass systems and the like, it is not intended to be limited to the details shown, since various modifications and structural changes may be made without departing in any way from the spirit of this invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A frictionless coupling, comprising, in combination, a pair of elongated parallel carriers for respectively carrying a pair of devices; support means mounting said carriers for respective turning movement about their axes; a pair of toothed sectors respectively fixed to said carriers and extending toward each other, the tips of the teeth of said sectors being located along a pair of circles which are substantially tangent to each other and the teeth of one of said sectors being located respectively opposite the gaps between the teeth of the other of said sectors; and elongated flexible means connected to one of said toothed sectors, extending therefrom along the tips of the teeth thereof through the point of tangency between said circles along the tips of the teeth of the other of said sectors and being connected to said other sector, whereby the tips of the teeth of one of said sectors respectively engage portions of said elongated flexible means extending between the tips of the teeth of the other of said sectors, so that turning of one of said carriers and the sector connected thereto will produce through said elongated flexible means an equal and opposite turning of the other of said sectors and carrier connected thereto without tendency of said carriers and the devices carried thereby to approach each other and without transmitting any shocks from one of the carriers to the other.

2. A frictionless coupling, comprising, in combination, a pair of elongated parallel carriers for respectively carrying a pair of devices; support means mounting said carriers for respective turning movement about their axes; a pair of toothed sectors respectively fixed to said carriers and extending toward each other, the tips of the teeth of said sectors being located along a pair of circles which are substantially tangent to each other and the teeth of one of said sectors being located respectively opposite the gaps between the teeth of the other of said sectors; and a pair of bands respectively connected to opposite sides of one of said sectors, extending along the tips of the teeth thereof toward each other in opposite directions through the point of tangency of said circles and in opposite directions away from each other along the tips of the teeth of the other of said sectors respectively to opposite sides of the latter, and said bands being respectively connected to said opposite sides of said other toothed sector, whereby the tips of the teeth of one of said sectors respectively engage portions of said bands extending between the tips of the teeth of the other of said sectors, so that turning of one of said carriers and the sector connected thereto will produce through said band means an equal and opposite turning of the other of said sectors and carrier connected thereto without tendency of said carriers and the devices carried thereby to approach each other and without transmitting any shocks from one of the carriers to the other.

3. A frictionless coupling, comprising, in combination, a pair of elongated parallel carriers for respectively carrying a pair of devices; support means mounting said carriers for respective turning movement about their axes; a pair of toothed sectors respectively fixed to said carriers and extending toward each other, the tips of the teeth of said sectors being located along a pair of circles which are substantially tangent to each other and the teeth of one of said sectors being located respectively opposite the gaps between the teeth of the other of said sectors; and a pair of bands respectively connected to opposite sides of one of said sectors, extending along the tips of the teeth thereof toward each other in opposite directions through the point of tangency of said circles and in opposite directions away from each other along the tips of the teeth of the other of said sectors respectively to opposite sides of the latter, and said bands being respectively connected to said opposite sides of said other toothed sector, whereby the tips of the teeth of one of said sectors respectively engage portions of said bands extending between the tips of the teeth of the other of said sectors, so that turning of one of said carriers and the sector connected thereto will produce through said band means an equal and opposite turning of the other of said sectors and carrier connected thereto without tendency of said carriers and the devices carried thereby to approach each other and without transmitting any shocks from one of the carriers to the other, one of said bands including a pair of parallel band portions which are spaced from each other and the other of said bands including a pair of parallel band portions which are closer together than and pass between said band portions of said one band.

4. A frictionless coupling, comprising, in combination, a pair of elongated parallel carriers for respectively carrying a pair of devices; support means mounting said carriers for respective turning movement about their axes; a pair of toothed sectors respectively fixed to said carriers and extending toward each other, the tips of the teeth of said sectors being located along a pair of circles which are substantially tangent to each other, and said toothed sectors having a common median plane passing centrally therethrough normally to the axes of said carriers; and a pair of bands respectively connected to opposite sides of one of said sectors, extending along the tips of the teeth thereof toward each other in opposite directions through the point of tangency of said circles and in opposite directions away from each other along the tips of the teeth of the other of said sectors respectively to opposite sides of the latter, and said bands being respectively connected to said opposite sides of said other toothed sector, so that turning of one of said carriers and the sector connected thereto will produce through said band means an equal and opposite turning of the other of said sectors and carrier connected thereto without tendency of said carriers and the devices carried thereby to approach each other, each of said bands being symmetrically arranged with respect to said median plane to prevent any tendency of said sectors to turn about a straight line in said median plane extending across the axes of said carriers.

5. A frictionless coupling, comprising, in combination, a pair of elongated parallel carriers for respectively carrying a pair of devices; support means mounting said carriers for respective turning movement about their axes; a pair of toothed sectors respectively fixed to said carriers and extending toward each other, the tips of the teeth of said sectors being located along a pair of circles which are substantially tangent to each other, and said toothed sectors having a common median plane passing centrally therethrough normally to the axes of said carriers; and a pair of bands respectively connected to opposite sides of one of said sectors, extending along the tips of the teeth thereof toward each other in opposite directions through the point of tangency of said circles and in opposite directions away from each other along the tips of the teeth of the other of said sectors respectively to opposite sides of the latter, and said bands being respectively connected to said opposite sides of said other toothed sector, so that turning of one of said carriers and the sector connected thereto will produce through said band means an equal and opposite turning of the other of said sectors and carrier connected thereto without tendency of said carriers and the devices carried thereby to approach each other, each of said bands being symmetrically arranged with respect to said median plane to prevent any tendency of said sectors to turn about a straight line in said median plane extending across the axes of said carriers, said bands including parallel band portions extending between said sectors with the band portions of one band being even in number and the band portions of the other band being odd in number.

6. A frictionless coupling, comprising, in combination, a pair of elongated parallel carriers for respectively carrying a pair of devices; support means mounting said carriers for respective turning movement about their axes; a pair of toothed sectors respectively fixed to said carriers and extending toward each other, the tips of the teeth of said sectors being located along a pair of circles which are substantially tangent to each other and the teeth of one of said sectors being located respectively opposite the gaps between the teeth of the other of said sectors; a pair of bands respectively connected to opposite sides of one of said sectors, extending along the tips of the teeth thereof toward each other in opposite directions through the point of tangency of said circles and in opposite directions away from each other along the tips of the teeth of the other of said sectors respectively to opposite sides of the latter whereby the tips of the teeth of one of said sectors respectively engage portions of said bands extending between the tips of the teeth of the other of said sectors; a pair of pulleys respectively located adjacent said opposite sides of said other sector and said bands passing about said pulleys, respectively; and a pair of springs respectively connected at one end to said pulleys and at an opposite end to said sides of said other sector.

7. A frictionless coupling, comprising, in combination, a pair of elongated parallel carriers for respectively carrying a pair of devices; support means mounting said carriers for respective turning movement about their axes; a pair of toothed sectors respectively fixed to said carriers and extending toward each other, the tips of the teeth of said sectors being located along a pair of circles which are substantially tangent to each other and the teeth of one of said sectors being located respectively opposite the centers of the gaps between the teeth of the other of said sectors, said gaps of each sector being wider than the teeth thereof; and elongated flexible means connected to one of said toothed sectors, extending therefrom along the tips of the teeth thereof through the point of tangency between said circles along the tips of the teeth of the other of said sectors and being connected to said other sector, whereby the tips of the teeth of one of said sectors respectively engage portions of said elongated flexible means extending between the tips of the teeth of the other of said sectors, so that turning of one of said carriers and the sector connected thereto will produce through said elongated flexible means an equal and opposite turning of the other of said sectors and carrier connected thereto without tendency of said carriers and the devices carried thereby to approach each other and without transmitting any shocks from one of the carriers to the other.

References Cited in the file of this patent
UNITED STATES PATENTS

| | | |
|---|---|---|
| 637,350 | Rowlands | Nov. 21, 1899 |
| 1,350,769 | Bartlett | Aug. 24, 1920 |
| 1,751,658 | Ready | Mar. 25, 1930 |
| 2,521,919 | Johnson | Sept. 12, 1950 |